(12) United States Patent
Du

(10) Patent No.: US 12,205,400 B2
(45) Date of Patent: Jan. 21, 2025

(54) ULTRASONIC TRANSCEIVER SYSTEM AND ELECTRONIC DEVICE

(71) Applicant: HUIKE (SINGAPORE) HOLDING PTE. LTD., The Aries (SG)

(72) Inventor: Canhong Du, Shenzhen (CN)

(73) Assignee: HUIKE (SINGAPORE) HOLDING PTE.LTD., The Aries (SG)

( * ) Notice: Subject to any disclaimer, the term of this patent is extended or adjusted under 35 U.S.C. 154(b) by 0 days.

(21) Appl. No.: 18/455,690

(22) Filed: Aug. 25, 2023

(65) Prior Publication Data

US 2023/0401887 A1 Dec. 14, 2023

Related U.S. Application Data

(63) Continuation of application No. PCT/CN2022/144383, filed on Dec. 30, 2022.

(30) Foreign Application Priority Data

Jun. 14, 2022 (WO) ................ PCT/CN2022/098576
Jul. 14, 2022 (WO) ................ PCT/CN2022/105775

(51) Int. Cl.
  *G06V 40/13* (2022.01)
  *B06B 1/02* (2006.01)
  *B06B 1/06* (2006.01)

(52) U.S. Cl.
  CPC ........ *G06V 40/1306* (2022.01); *B06B 1/0207* (2013.01); *B06B 1/06* (2013.01)

(58) Field of Classification Search
  None
  See application file for complete search history.

(56) References Cited

U.S. PATENT DOCUMENTS

| | | | |
|---|---|---|---|
| 5,380,959 A | 1/1995 | Knowles | |
| 2006/0215028 A1* | 9/2006 | Abe | G07C 9/00309 348/148 |

(Continued)

FOREIGN PATENT DOCUMENTS

| | | |
|---|---|---|
| CN | 1486126 A | 3/2004 |
| CN | 101819184 A | 9/2010 |

(Continued)

OTHER PUBLICATIONS

International Search Report and Written Opinion issued on Feb. 22, 2023, in corresponding International Application No. PCT/CN2022/144383, 13 pages.

(Continued)

*Primary Examiner* — Joseph R Haley
(74) *Attorney, Agent, or Firm* — Maier & Maier, PLLC

(57) ABSTRACT

An ultrasonic transceiver system and an electronic device. The ultrasonic transceiver system includes a signal generating circuit and an ultrasonic sensor chip. The signal generating circuit is composed of discrete devices and includes a pulse generating circuit and a resonance circuit. The pulse generating circuit receives a control signal output by the ultrasonic sensor chip, and generates, according to the control signal, a first pulse voltage signal and a second pulse voltage signal which are in opposite phase to each other, and the resonant circuit receives the first pulse voltage signal and the second pulse voltage signal which are in opposite phase to each other and generates a drive signal under action of the first pulse voltage signal and the second pulse voltage signal. The ultrasonic sensor chip receives the drive signal and generates an ultrasonic signal according to the drive signal.

16 Claims, 5 Drawing Sheets

(56) References Cited

U.S. PATENT DOCUMENTS

| | | | |
|---|---|---|---|
| 2011/0025649 A1 | 2/2011 | Nadjar et al. | |
| 2011/0102114 A1* | 5/2011 | Reiche | H03J 3/20 333/81 R |
| 2015/0016223 A1* | 1/2015 | Dickinson | G06F 3/043 367/87 |
| 2018/0129849 A1 | 5/2018 | Strohmann et al. | |
| 2019/0026521 A1* | 1/2019 | Du | G06V 40/1306 |
| 2020/0036096 A1* | 1/2020 | Kurokawa | B60R 25/24 |
| 2021/0239553 A1* | 8/2021 | Akhbari | H10N 30/857 |
| 2022/0139102 A1* | 5/2022 | Zhang | G06V 40/1306 382/124 |

FOREIGN PATENT DOCUMENTS

| | | |
|---|---|---|
| CN | 103107803 A | 5/2013 |
| CN | 103731166 A | 4/2014 |
| CN | 104135274 A | 11/2014 |
| CN | 109003950 A | 12/2018 |
| CN | 109525226 A | 3/2019 |
| CN | 110560347 A | 12/2019 |
| CN | 210005688 U | 1/2020 |
| CN | 111523436 A | 8/2020 |
| CN | 112181213 A | 1/2021 |
| CN | 112580534 A | 3/2021 |
| CN | 113343800 A | 9/2021 |
| CN | 114749359 A | 7/2022 |
| CN | 115188034 A | 10/2022 |
| JP | 2004336875 A | 11/2004 |
| JP | 2015190817 A | 11/2015 |
| KR | 20190087339 A | 7/2019 |

OTHER PUBLICATIONS

Chinese Office Action issued on Jun. 14, 2023, in corresponding Application No. 202210854369.3, Concise Explanation is attached, 7 pages.

Chinese Notification of Grant of Patent Rights for Invention issued on Aug. 1, 2023, in corresponding Application No. 202210854369.3, 5 pages.

Office Action issued on Jul. 11, 2024, in corresponding Chinese Application No. 202211733544.X, 16 pages.

Office Action issued on Apr. 24, 2024, in related U.S. Appl. No. 18/455,554, 35 pages.

Wei, "Development of the digital ultrasonic rangefinder", Electronic Design Engineering, Oct. 2009, vol. 17, No. 10, pp. 39-41 (English abstract provided).

* cited by examiner

ULTRASONIC TRANSCEIVER SYSTEM AND ELECTRONIC DEVICE

CROSS-REFERENCE TO RELATED APPLICATIONS

This application is a continuation of International Application No. PCT/CN2022/144383, filed on Dec. 30, 2022, which claims priority to International Application No. PCT/CN2022/098576, entitled "SIGNAL GENERATING CIRCUIT AND ULTRASONIC FINGERPRINT IDENTIFICATION APPARATUS" and filed with the China National Intellectual Property Administration on Jun. 14, 2022, and International Application No. PCT/CN2022/105775, entitled "ULTRASONIC FINGERPRINT DETECTION APPARATUS AND ELECTRONIC DEVICE" and filed with the China National Intellectual Property Administration on Jul. 14, 2022. The contents of the three applications are incorporated herein by reference in their entireties.

TECHNICAL FIELD

The present application relates to the field of fingerprint detection technologies and, in particular, to an ultrasonic transceiver system and an electronic device.

BACKGROUND

With the development and progress of science and technology, fingerprint detection technology is increasingly applied to smart terminal devices such as mobile phones and computers, so as to improve people's experience in using smart terminal devices.

In the solution of ultrasonic fingerprint detection technology, it is usually necessary to generate a sine wave signal, and then use the sine wave signal as a drive signal to generate an ultrasonic signal for fingerprint detection. In some implementations of generating a sine wave signal, it is usually necessary to adopt a complex circuit structure to achieve multiple boosts, resulting in a solution having a large system architecture, complex circuits, and high costs, while in some implementations of generating a sine wave signal by boosting the voltage once, because a voltage value of the sine wave signal is relatively low, there is a problem that a driving effect of the sine wave signal as a drive signal is poor.

SUMMARY

The present application provides an ultrasonic transceiver system and an electronic device, to solve the technical problems of complex circuit structure caused by generation of the sine wave signal and poor driving effect of the sine wave signal as the drive signal in the ultrasonic fingerprint detection technology.

In a first aspect, the present application provides an ultrasonic transceiver system, including: a signal generating circuit and an ultrasonic sensor chip;

where the signal generating circuit is composed of discrete devices and includes: a pulse generating circuit and a resonant circuit; the pulse generating circuit is configured to receive a control signal output by the ultrasonic sensor chip, and generate, according to the control signal, a first pulse voltage signal and a second pulse voltage signal which are in opposite phase to each other; and the resonant circuit is configured to receive the first pulse voltage signal and the second pulse voltage signal which are in opposite phase to each other, and generate a drive signal according to the first pulse voltage signal and the second pulse voltage signal which are in opposite phase to each other; and the ultrasonic sensor chip is configured to receive the drive signal and generate an ultrasonic signal according to the drive signal.

In a possible design, the resonant circuit includes a resonant inductor and a resonant capacitor;

one end of the resonant inductance is connected to a first pulse output end of the pulse generating circuit; the other end of the resonant inductance, one end of the resonant capacitor and an input end of the ultrasonic sensor chip are connected; and the first pulse output end is configured to output the first pulse voltage signal; and the other end of the resonant capacitor is connected to a second pulse output end of the pulse generating circuit, and the second pulse output end is configured to output the second pulse voltage signal;

where the resonant inductor and the resonant capacitor resonate under action of the first pulse voltage signal and the second pulse voltage signal, to generate a sine wave drive signal.

In a possible design, the signal generating circuit further includes a brake circuit, and the brake circuit includes a damping resistor;

one end of the damping resistor is connected to the first pulse output end of the pulse generating circuit, and the other end of the damping resistor is grounded.

In a possible design, the pulse generating circuit includes a first half-bridge circuit, a second half-bridge circuit, a first inverter and a second inverter;

an input end of the first half-bridge circuit is connected to a first output end and a second output end of the ultrasonic sensor chip, and an output end of the first half-bridge circuit is the first pulse output end of the pulse generating circuit;

an input end of the second half-bridge circuit is connected to an output end of the first inverter and an output end of the second inverter, and an output end of the second half-bridge circuit is the second pulse output end of the pulse generating circuit; and an input end of the first inverter is connected to the first output end of the ultrasonic sensor chip, and an input end of the second inverter is connected to the second output end of the ultrasonic sensor chip.

In a possible design, the first output end and the second output end of the ultrasonic sensor chip are configured to output a first pulse control signal and a second pulse control signal, respectively, and the control signal includes the first pulse control signal and the second pulse control signal.

In a possible design, the first half-bridge circuit includes a first P-channel metal oxide semiconductor (PMOS) transistor and a first N-channel metal oxide semiconductor (NMOS) transistor;

a gate of the first PMOS transistor is connected to the second output end of the ultrasonic sensor chip, and a source of the first PMOS transistor is connected to a power input end of the pulse generating circuit; and a drain of the first PMOS transistor is connected to a drain of the first NMOS transistor and is the output end of the first half-bridge circuit, a gate of the first NMOS transistor is connected to the first output end of the ultrasonic sensor chip, and a source of the first NMOS transistor is grounded.

In a possible design, the second half-bridge circuit includes a second PMOS transistor and a second NMOS transistor;

a gate of the second PMOS transistor is connected to the output end of the first inverter, and a source of the second PMOS transistor is connected to the power input end of the pulse generating circuit; and a drain of the second PMOS transistor is connected to a drain of the second NMOS transistor and is the output end of the second half-bridge circuit, a gate of the second NMOS transistor is connected to the output end of the second inverter, and a source of the second NMOS transistor is grounded.

In a possible design, the ultrasonic transceiver system further includes a main control module;

the main control module includes a power supply for supplying power to the signal generating circuit and the ultrasonic sensor chip.

In a possible design, the main control module further includes a serial peripheral interface (SPI) interface;

the SPI interface is used for communication between the main control module and the ultrasonic sensor chip.

In a possible design, the first pulse voltage signal is further, as a synchronization signal of the drive signal, input to the ultrasonic sensor chip.

In a possible design, the ultrasonic sensor chip includes an ultrasonic transducer;

the sine wave drive signal is used to drive the ultrasonic transducer to generate the ultrasonic signal.

In the second aspect, the present application provides an electronic device, including: a cover plate, and any possible ultrasonic transceiver system provided in the first aspect;

where the cover plate is configured to receive a press by a user's finger, and the ultrasonic transceiver system is arranged under the cover plate, to detect a fingerprint pressed on the cover plate by the user's finger.

In a possible design, the electronic device further includes a display screen, the cover plate is arranged above the display screen, and the ultrasonic transceiver system is arranged below the display screen.

The present application provides an ultrasonic transceiver system and an electronic device. The ultrasonic transceiver system includes a signal generating circuit and an ultrasonic sensor chip. The signal generating circuit is composed of discrete devices and includes a pulse generating circuit and a resonance circuit. The pulse generating circuit can receive a control signal output by the ultrasonic sensor chip, and generate, according to the control signal, a first pulse voltage signal and a second pulse voltage signal which are in opposite phase to each other, and the resonant circuit can receive the first pulse voltage signal and the second pulse voltage signal which are in opposite phase to each other and generate a drive signal under action of the first pulse voltage signal and the second pulse voltage signal. The ultrasonic sensor chip receives the drive signal and generates an ultrasonic signal according to the drive signal. In the ultrasonic transceiver system provided by the present application, during the generation of the drive signal, on one hand, there is no need of boost, and on the other hand, a voltage value of the drive signal is increased through the first pulse voltage signal and the second pulse voltage signal which are in opposite phase to each other, thus the problem of the circuit complexity caused by the boost and the problem of the low voltage value resulting in a poor driving effect can be overcome. The circuit structure is simple, and easy to implement and control, and the boost effect thereof is good.

DETAILED DESCRIPTION OF EMBODIMENTS

Figure 1:
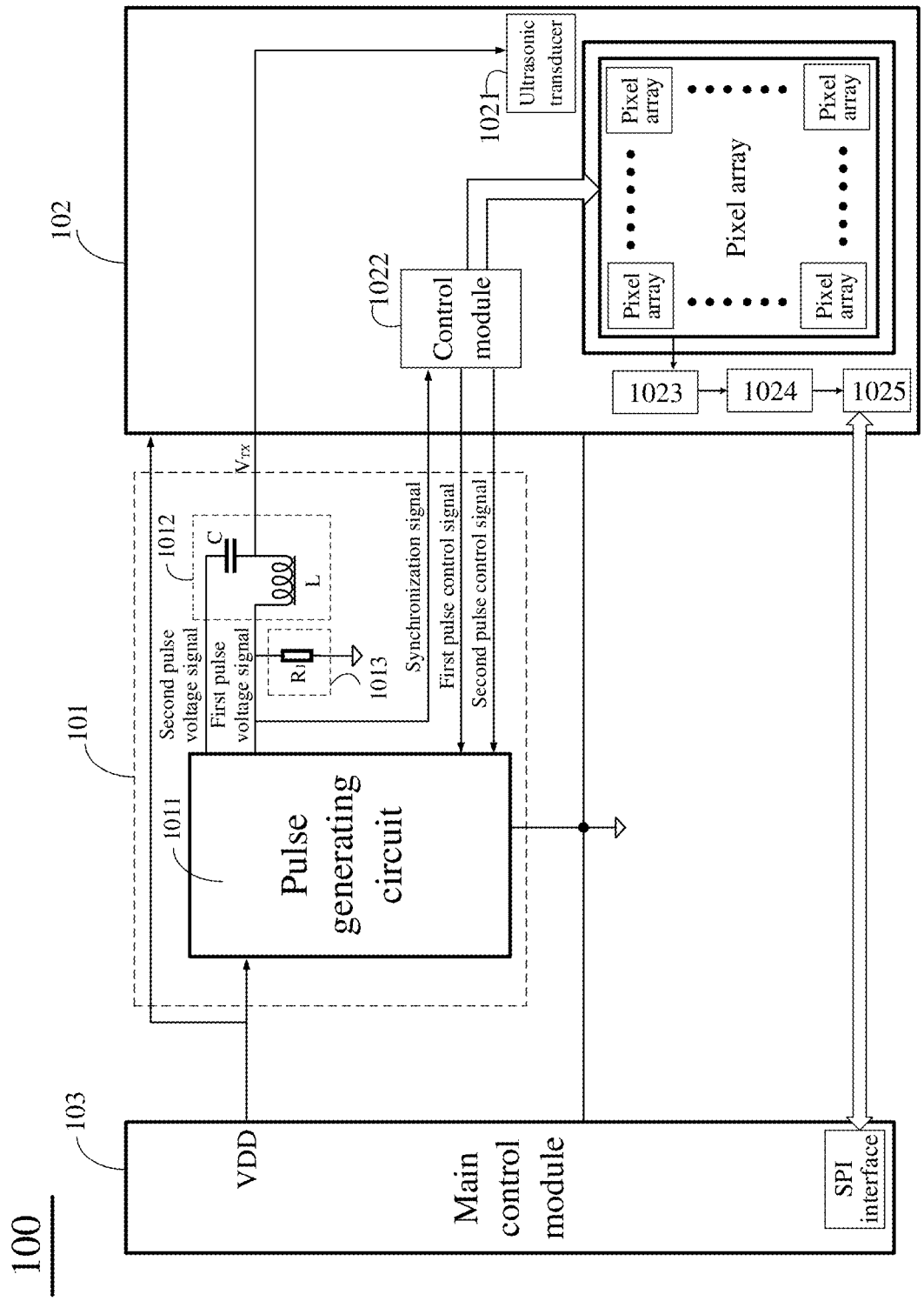
FIG. 1 is a schematic structural diagram of an ultrasonic transceiver system provided by an embodiment of the present application.

To make the objectives, technical solutions and advantages of embodiments of the present application clearer, the following clearly and comprehensively describes the technical solutions in the embodiments of the present disclosure with reference to the accompanying drawings in the embodiments of the present disclosure. Apparently, the described embodiments are some but not all of the embodiments of the present disclosure. All other embodiments obtained by persons of ordinary skill in the art based on the embodiments in the present disclosure without creative efforts shall fall within the protection scope of the present disclosure.

The terms "first", "second", "third", "fourth", and the like (if any) in the specification and claims of the present application and the above drawings are intended to distinguish between similar objects, but do not necessarily indicate a specific order or sequence. It is to be understood that the data used in this way is interchangeable under appropriate circumstances such that the embodiments of the present application described herein, for example, can be implemented in sequences in addition to those illustrated or described herein. Furthermore, the terms "include", "have", as well as any variations thereof, are intended to cover a non-exclusive inclusion. For example, a process, method, system, product or device that includes a series of steps or units is not necessarily limited to the expressly listed steps or units, but instead may include other steps or units not expressly listed or inherent to the process, method, product or device.

In the solution of ultrasonic fingerprint detection technology, it is usually necessary to generate a sine wave signal, and then use the sine wave signal as a drive signal to generate an ultrasonic signal for fingerprint detection. In some implementations of generating a sine wave signal, it is usually necessary to adopt a complex circuit structure to achieve multiple boosts, resulting in a solution having a large system architecture, complex circuits, and high costs, while in some implementations of generating a sine wave signal by boosting the voltage once, because a voltage value of the sine wave signal is relatively low, there is a problem that a driving effect of the sine wave signal as a drive signal is poor.

In view of the above-mentioned problems existing in the prior art, the present application provides an ultrasonic transceiver system and an electronic device. The inventive idea of the ultrasonic transceiver system provided by the present application is to set up an ultrasonic transceiver system including a signal generating circuit and an ultrasonic sensor chip, where the signal generating circuit is composed of discrete devices and includes a pulse generating circuit and a resonance circuit. The ultrasonic sensor chip outputs a control signal to the pulse generating circuit. Under action of the control signal, the pulse generating circuit can generate a first pulse voltage signal and a second pulse voltage signal which are in opposite phase to each other, and the resonant circuit receives the first pulse voltage signal and the second pulse voltage signal which are in opposite phase to each other, and resonates under action of the first pulse voltage signal and the second pulse voltage signal, to generate a drive signal. The ultrasonic sensor chip receives the drive signal and generates, under action of the drive signal, an ultrasonic signal which can be used for fingerprint detection. In the embodiments of the present application, there is no need of boost in the implementation of generating the drive signal, and the pulse generating circuit can generate the first pulse voltage signal and the second pulse voltage signal which are in opposite phase to each other, so a voltage value of the drive signal generated under action of the first pulse voltage signal and the second pulse voltage signal which are in opposite phase to each other is double that of a drive signal generated by one pulse voltage signal, thereby increasing the voltage value of the drive signal and improving the driving effect, overcoming the problem of the circuit complexity caused by the boost and the problem of the low voltage value resulting in a poor driving effect in the prior art. The circuit structure is simple, and easy to implement and control, and the boost effect thereof is good.

The technical solution of the present application and how the technical solution of the present application solves the above technical problems will be described in detail below with specific embodiments. The following specific embodiments may be combined with each other, and the same or similar concepts or processes may not be repeated in some embodiments. Embodiments of the present application will be described below in conjunction with the accompanying drawings.

FIG. 1 is a schematic structural diagram of an ultrasonic transceiver system provided by an embodiment of the present application. As shown in FIG. 1, an ultrasonic transceiver system 101 provided by the embodiment of the present application includes: a signal generating circuit 101 and an ultrasonic sensor chip 102.

The signal generating circuit 101 is composed of discrete devices and includes: a pulse generating circuit 1011 and a resonance circuit 1012.

The pulse generating circuit 1011 is configured to receive a control signal output by the ultrasonic sensor chip 102, and generate, according to the control signal, a first pulse voltage signal and a second pulse voltage signal which are in opposite phase to each other.

The resonant circuit 1012 is configured to receive the first pulse voltage signal and the second pulse voltage signal which are in opposite phase to each other, and generate a drive signal according to the first pulse voltage signal and the second pulse voltage signal which are in opposite phase to each other.

The ultrasonic sensor chip 102 is configured to receive the drive signal and generate an ultrasonic signal according to the drive signal.

The signal generating circuit 101 may be of a circuit structure composed of discrete devices, instead of being provided as a single chip, so that the manufacturing cost can be reduced. Therefore, compared with the "two-chip" architecture, an ultrasonic fingerprint detection device 200 provided in an embodiment of the present application only includes one ultrasonic fingerprint sensor chip 220, and the overall manufacturing cost will be greatly reduced.

Specifically, the pulse generating circuit 1011 can receive the control signal provided by the ultrasonic sensor chip 102, and generate the first pulse voltage signal and the second pulse voltage signal which are in opposite phase to each other under the action of the control signal. The resonant circuit 1012 is connected to the pulse generating circuit 1011, and the first pulse voltage signal and the second pulse voltage signal which are in opposite phase to each other, generated by the pulse generating circuit 1011, can be input to the resonant circuit 1012. The resonant circuit 1012 receives the first pulse voltage signal and the second pulse voltage signal which are in opposite phase to each other, and generates the drive signal under the action of the first pulse voltage and the second pulse voltage signal which are in opposite phase to each other. The resonant circuit 1012 is further connected to the ultrasonic sensor chip 102, and the drive signal generated by the resonant circuit 1012 can be output to the ultrasonic sensor chip 102. The ultrasonic sensor chip 102 receives the drive signal, and generates the ultrasonic signal under the action of the drive signal, and the ultrasonic signal can be for example used for fingerprint detection.

In an implementation, the signal generating circuit 101 and the ultrasonic sensor chip 102 may share an input power supply, and the input power supply may provide a same voltage value for both of them. For example, the voltage value provided by the input power supply can be between 3V and 4.5V.

In an implementation, the ultrasonic transceiver system 100 may further include a main control module 103, and the main control module 103 may include a power supply VDD, which can be used as an input power supply to provide electrical energy for the signal generating circuit 101 and the ultrasonic sensor chip 102.

In some embodiments, the main control module 103 may be provided with a control chip of an electronic device of the ultrasonic transceiver system 100, and the electronic device may be a terminal device such as a mobile phone or a tablet computer, etc. The power supply VDD included in the main control module 103 can be the power supply of the terminal device, so that no additional power supply is needed, and the overall power consumption of the ultrasonic transceiver system 100 can be saved.

In an implementation, the main control module 103 may further include an SPI interface which can be used for communication between the main control module 103 and the ultrasonic sensor chip 102.

The pulse generating circuit 1011 can generate the first pulse voltage signal and the second pulse voltage signal which are in opposite phase to each other under the action of the control signal, and the drive signal generated by the resonant circuit 1012 under the action of the first pulse voltage signal and the second pulse voltage signal which are in opposite phase to each other can have a voltage value which is double a voltage value of a drive signal generated by a single pulse voltage signal. It can be seen that the drive signal generated by the signal generating circuit 101 in the ultrasonic transceiver system 100 provided by the embodiment of the present application can be of a higher voltage value without needing a boost operation, thus overcoming the problem of the circuit complexity caused by the required boost operation and the problem of the low voltage value of the drive signal resulting in a poor driving effect in the prior art. The circuit structure is simple, and easy to implement and control, and the boost effect thereof is good.

In a possible design, the resonant circuit 1012 includes a resonant inductor L and a resonant capacitor C.

Referring to FIG. 1, one end of the resonant inductor L is connected to a first pulse output end of the pulse generating circuit 1011. The other end of the resonant inductor L, one end of the resonant capacitor C and an input end of the ultrasonic sensor chip 102 are connected. The first pulse output end of the pulse generating circuit 1011 is configured to output the first pulse voltage signal.

The other end of the resonant capacitor C is connected to a second pulse output end of the pulse generating circuit 1011, and the second pulse output end of the pulse generating circuit 1011 is configured to output the second pulse voltage signal.

The first pulse voltage signal and the second pulse voltage signal are in opposite phase to each other.

The resonant inductor L and the resonant capacitor C resonate under the action of the first pulse voltage signal and the second pulse voltage signal, and can generate a sine wave drive signal $V_{TX}$, and the drive signal described above includes the sine wave drive signal $V_{TX}$.

For example, by controlling the first pulse voltage signal and the second pulse voltage signal output by the pulse generating circuit 1011, the resonant circuit 1012 is, under the action of the first pulse voltage signal and the second pulse voltage signal, enabled to resonate to obtain the sine wave drive signal $V_{TX}$.

Figure 2:
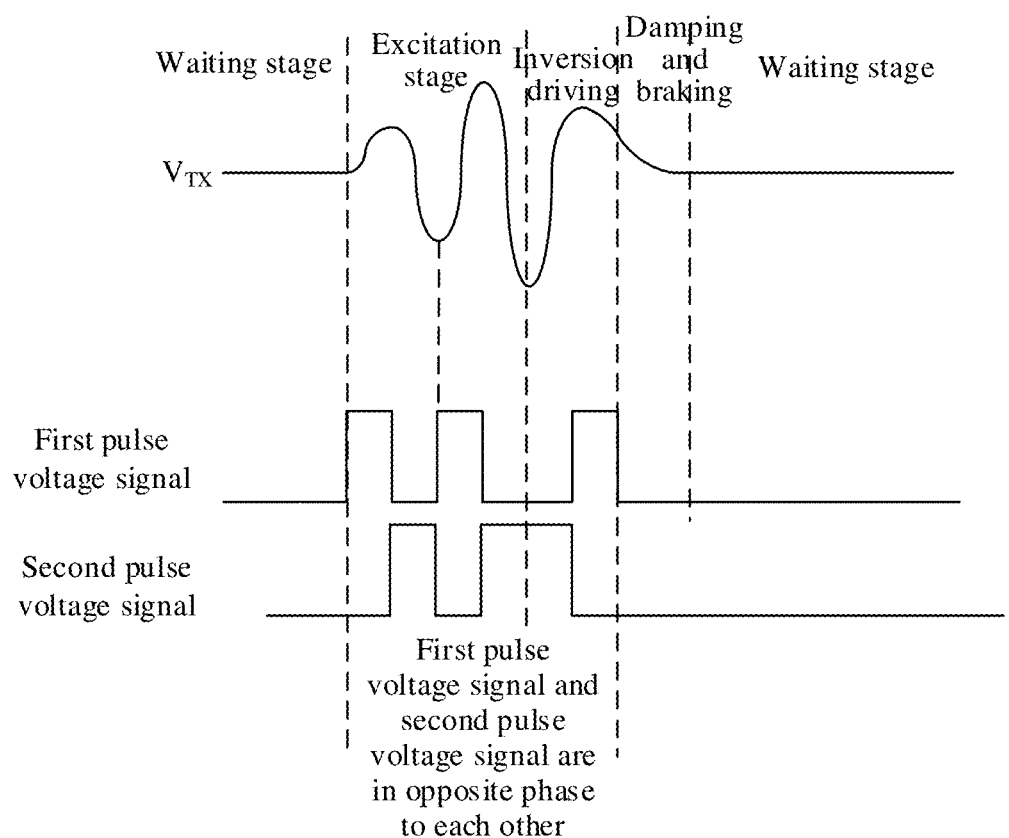
FIG. 2 is a schematic diagram of a waveform provided by an embodiment of the present application.

For ease of understanding, FIG. 2 shows a schematic waveform diagram of the first pulse voltage signal, the second pulse voltage signal and the sine wave drive signal $V_{TX}$ provided by the embodiment of the present application.

As shown in FIG. 2, a working state of the signal generating circuit 101 includes: a waiting stage, an excitation stage and an inversion stage.

In the waiting stage of the signal generating circuit 101, the resonant circuit 1012 does not resonate, the first pulse voltage signal output by the pulse generating circuit 1011 can be 0 or at a high-impedance state, and the second pulse voltage signal output by the pulse generating circuit 1011 can be 0, 1 or at a high-impedance state. Here, 0 indicates that an output voltage is 0, that is, low level, 1 indicates that the output voltage is the power supply voltage VDD, that is, high level, and the high-impedance state indicates that there is no output voltage in a high-resistance state. In FIG. 2, the first pulse voltage signal and the second pulse voltage signal in the waiting stage are illustrated with an output of 0 as an example. Correspondingly, the drive signal $V_{TX}$ in the waiting stage is low level.

In the excitation stage of the signal generating circuit 101, by controlling the pulse generating circuit 1011 to output the first pulse voltage signal and the second pulse voltage signal output which are in opposite phase to each other, the first pulse voltage signal and the second pulse voltage signal output alternate between the high level and the low level, the resonant inductance L and the resonant capacitance C in the resonant circuit 1012 is thus enabled to resonate under the action of the first pulse voltage signal and the second pulse voltage signal output which are in opposite phase to each other and which alternate between the high level and the low level, to generate the sine wave drive signal $V_{TX}$.

When it need to stop outputting the sine wave drive signal $V_{TX}$, for example, the first pulse voltage signal and the second pulse voltage signal can be output at a low level or at a high-impedance state, so as to make the resonance to be zero by an equivalent resistance R (not shown in FIG. 1) of the resonant inductor L in the resonant circuit 1012. But in fact, since the oscillating energy of the resonant circuit 1012 cannot disappear immediately, the sine wave drive signal $V_{TX}$ drops slowly to zero. Therefore, before outputting the first pulse voltage signal and the second pulse voltage signal at a low level or high-impedance state, an inversion driving method can be used, that is, both the first pulse voltage signal and the second pulse voltage signal are inverted and then output, to speed up the drop of the resonance energy of the resonance circuit 1012 to zero.

Specifically, the first pulse voltage signal and the second pulse voltage signal are respectively inverted and output alternately at low and high levels to generate an inverted first pulse voltage signal and an inverted second pulse voltage signal. As shown in FIG. 2, the phase of the first pulse voltage signal in the inversion stage and the phase of the first pulse voltage signal in the excitation stage are inverse to each other, and the phase of the second pulse voltage signal in the inversion stage and the phase of the second pulse voltage signal in the excitation stage are inverse to each other. The inverted first pulse voltage signal and the inverted second pulse voltage signal act on the resonant circuit 1012 to generate a sine wave drive signal $V_{TX}$ in the inversion stage. It can be seen from FIG. 2 that the resonance energy of the sine wave drive signal $V_{TX}$ in the inversion stage is lower than the resonance energy of the sine wave drive signal $V_{TX}$ in the excitation stage.

Since the oscillating energy of the resonant circuit 1012 cannot disappear immediately and there is a residual vibration phenomenon, in some embodiments, the signal generating circuit 101 may further include a brake circuit 1013.

Reference is still made to FIG. 1, the brake circuit 1013 may include a damping resistor R1.

One end of the damping resistor R1 is connected to the first pulse output end of the pulse generating circuit 1011, and the other end of the damping resistor R1 is grounded. The brake circuit 1013 including the damping resistor R1 is added to the signal generating circuit 101 and it is expected that when the resonant circuit 1012 stops outputting the sine wave drive signal $V_{TX}$, the excess signal energy generated by the resonant circuit 1012 can be absorbed, thereby alleviating the residual vibration by the sine wave drive signal $V_{TX}$ output by the resonant circuit 1012 and improving the quality of the sine wave drive signal $V_{TX}$.

The equivalent resistance R of the resonant inductor L in the resonant circuit 1012 can work together with the damping resistor R1 to dampen and "brake" the resonance. In the damping-braking stage in the working state of the signal generating circuit 101 as shown in FIG. 2, the first pulse voltage signal and the second pulse voltage signal are controlled to be at a low level, and the damping resistor R1 in the brake circuit 1013 can further act to dampen and "brake" the resonance of the resonant circuit 1012, so that the resonance energy of the resonance circuit 1012 can be quickly reduced and the resonance can quickly return to zero. In an implementation, during the damping-braking stage, the second pulse voltage signal can also be at a high level.

A resistance value of the damping resistor R1 is related to the characteristic impedance Z of the resonant circuit 1012. In order to achieve a better damping and "braking" effect, in some embodiments, the resistance value of the damping resistor R1 may be between 0.8*Z and 2*Z.

The characteristic impedance Z and values of the resonant inductance L and the resonant capacitor C in the resonant circuit 1012 satisfy the following formula (1):

$$Z=\sqrt{L_1/C_1} \quad (1)$$

where L1 and C1 are the values of the resonant inductance L and the resonant capacitor C in the resonant circuit 1012, respectively.

In an implementation, the resistance value of the damping resistor R1 includes but is not limited to 1.4*Z.

It can be understood that the above FIG. 1 and FIG. 2 are only for illustration rather than limitation, showing the circuit structure of the resonant circuit 1012 and the pulse generating circuit 1011 and the corresponding signal waveform diagrams in an embodiment. In some alternative implementations, other circuit structures can also be adopted for the resonant circuit 1012 and the pulse generating circuit 1011, for the purpose that the resonant circuit 1012 and the pulse generating circuit 1011 can cooperate to resonantly boost the input power. The specific circuit structures of the resonant circuit 1012 and the pulse generating circuit 1011 are not limited in the embodiment of the present application.

In addition, in FIG. 2 and the schematic waveform diagrams shown below, the first pulse voltage signal and the second pulse voltage signal of only two cycles are shown in the excitation stage and the signals of the two cycles are only for illustration. There may be signals of any other number of cycles in the excitation stage, and the embodiment of the present application does not limit the number of cycles of the signals in the excitation stage.

The ultrasonic transceiver system provided in the embodiment of the present application includes a signal generating circuit and an ultrasonic sensor chip. The signal generating circuit is composed of discrete devices and includes a pulse generating circuit and a resonance circuit. The pulse generating circuit can receive a control signal output by the ultrasonic sensor chip, and generate, according to the control signal, a first pulse voltage signal and a second pulse voltage signal which are in opposite phase to each other, and the resonant circuit can receive the first pulse voltage signal and the second pulse voltage signal which are in opposite phase to each other and generate a drive signal under action of the first pulse voltage signal and the second pulse voltage signal. The ultrasonic sensor chip receives the drive signal and generates an ultrasonic signal according to the drive signal. During the generation of the drive signal, on one hand, there is no need of boost, and on the other hand, a voltage value of the drive signal is increased through the first pulse voltage signal and the second pulse voltage signal which are in opposite phase to each other, thus the problem of the circuit complexity caused by the boost and the problem of the low voltage value resulting in a poor driving effect can be overcome. The circuit structure is simple, and easy to implement and control, and the boost effect thereof is good.

In an implementation, the first pulse voltage signal may further, as a synchronization signal of the drive signal, be input to the ultrasonic sensor chip 102, so as to perform synchronization of the drive signal. It can be understood that the drive signal includes the sine wave drive signal $V_{TX}$.

In some embodiments, the ultrasonic sensor chip 102 may include an ultrasonic transducer 1021. The ultrasonic transducer 1021 can generate the ultrasonic signal under the action of the drive signal provided by the signal generating circuit 1012. For example, when the ultrasonic transceiver system 100 is used for fingerprint detection, the ultrasonic transducer 1021 can generate the ultrasonic signal under the action of the drive signal, and receive an echo signal which is a reflection of the ultrasonic signal at the user's finger, to generate an electrical signal. Then, other detection circuits, such as an echo detection circuit, in the ultrasonic sensor chip 102 can be configured to detect the electrical signal to implement fingerprint detection.

In an implementation, the ultrasonic transducer 1021 may include a piezoelectric layer and upper and lower electrode layers. For example, the piezoelectric material in the piezoelectric layer includes but is not limited to polyvinylidene fluoride (PVDF), polyvinylidene fluoride-trifluoroethene (PVDF-TrFE) copolymer, etc. When high-voltage drive signals from the upper and lower electrode layers are applied to the piezoelectric layer, the piezoelectric layer will convert the electrical energy into mechanical energy, thereby generating an ultrasonic signal. Correspondingly, the piezoelectric layer can also convert the returned ultrasonic echo signal from mechanical energy into electrical energy, thereby generating an electrical signal corresponding to the echo signal.

Since the ultrasonic transducer 1021 is a capacitive load, assuming its capacitance is $C_0$, the relationship between $C_0$ and a capacitance $C_1$ of the resonant capacitor C can satisfy $C_1 \geq C_0$ to obtain an optimal output voltage amplitude. At the same time, an inductance $L_1$ of the resonant inductor L, the capacitance $C_0$ of the ultrasonic transducer 1021, the capacitance $C_1$ of the resonant capacitor C, and a pulse frequency f need to satisfy the following formula (2):

$$f = \frac{1}{2\pi\sqrt{L_1(C_0 + C_1)}} \quad (2)$$

In some embodiments, the ultrasonic sensor chip 102 in the ultrasonic transceiver system 100 further includes: a control module 1022, a transducer module and a detection module.

The control module 1022 is configured to provide the control signal to the signal generating circuit 101 to control the signal generating circuit 101 to generate the drive signal. The transducer module is configured to receive the drive signal to generate the ultrasonic signal, and to generate the echo signal by using the ultrasonic signal. The transducer module is further configured to convert the echo signal into the electrical signal. The transducer module may include the ultrasonic transducer 1021. The detection module is configured to detect the electrical signal to implement a corresponding function, for example, to detect the electrical signals to implement fingerprint detection. The detection module is not shown in the drawings of the embodiment of the present application.

The control module 1022 can be understood as a controller of the ultrasonic sensor chip 102, and can be connected to the above-mentioned transduction module and detection module, and control the operation of the transduction module and detection module. In addition, the control module 1022 can also be configured to receive a synchronization signal.

In an implementation, the detection module may include a receiving module, a wave detection module and a signal accumulation module. The receiving module is configured to receive a plurality of electrical signals. The detection module is configured to detect amplitudes of the plurality of electrical signals. The signal accumulation module is configured to accumulate the amplitudes of the plurality of electrical signals to obtain a signal accumulation value, which is used for an average calculation to implement corresponding related functions, such as transmitting a digital signal of fingerprint data to an external device to have the digital signal averaged to detect the fingerprint of the user's finger.

In an implementation, the signal accumulation module may be an analog signal accumulator or integrator, or other types of circuit structures or devices, which is not specifically limited in the embodiment of the present application.

In an implementation, the ultrasonic sensor chip 102 may also include a readout module 1023, an analog-to-digital conversion module 1024 and an interface module 1025.

The readout module 1023 can read out the signal accumulation value generated by the above signal accumulation module to the analog-to-digital conversion module 1024. The analog-to-digital conversion module 1024 converts the signal accumulation value into a digital signal. The interface module 1025 can transmit the digital signal to an external device to have the digital signal averaged to implement corresponding related functions.

In an implementation, the readout module 1023 may specifically be a readout circuit. The analog-to-digital conversion module 1024 may be an analog-to-digital converter (ADC). The interface module 1025 includes but is not limited to an SPI interface.

In an implementation, in some alternative implementations, the above-mentioned readout module 1023, analog-to-digital conversion module 1024 and interface module 1025 may not be integrated in the ultrasonic sensor chip 102, but are arranged outside the ultrasonic sensor chip 102, thereby reducing a space required by installation of the ultrasonic sensor chip 102.

Further, the ultrasonic sensor chip 102 may further include a pixel array, and the pixel array is composed of a plurality of pixel cells. The control module 1022 is connected to the pixel array. Each pixel cell may include: an upper electrode, a piezoelectric layer, and a lower electrode. The upper electrodes of the plurality of pixel cells can be connected to each other to form an integral upper electrode, and this integral upper electrode can be electrically connected to a TX interface. The TX interface can receive the drive signal $V_{TX}$ generated by the signal generating circuit 101. In an implementation, when the ultrasonic transceiver system 100 is used for fingerprint detection, the pixel array is used for ultrasonic fingerprint imaging.

The lower electrodes of the plurality of pixel cells can be arranged separately from each other, that is, the lower electrodes of the plurality of pixel cells can form a lower electrode array, and the plurality of lower electrodes in the lower electrode array are of a same structure and are arranged on a same plane. The lower electrode in the pixel cell can also be referred to as a pixel electrode. In each pixel cell, a combination of the upper electrode, the piezoelectric layer and the lower electrode can form an ultrasonic transducer cell, and multiple ultrasonic transducer cells of the plurality of pixel cells can form a transducer module which can be configured to generate the ultrasonic signal under the action of the drive signal $V_{TX}$, and to receive the echo signal of the ultrasonic signal to generate a corresponding electrical signal.

Figure 3:
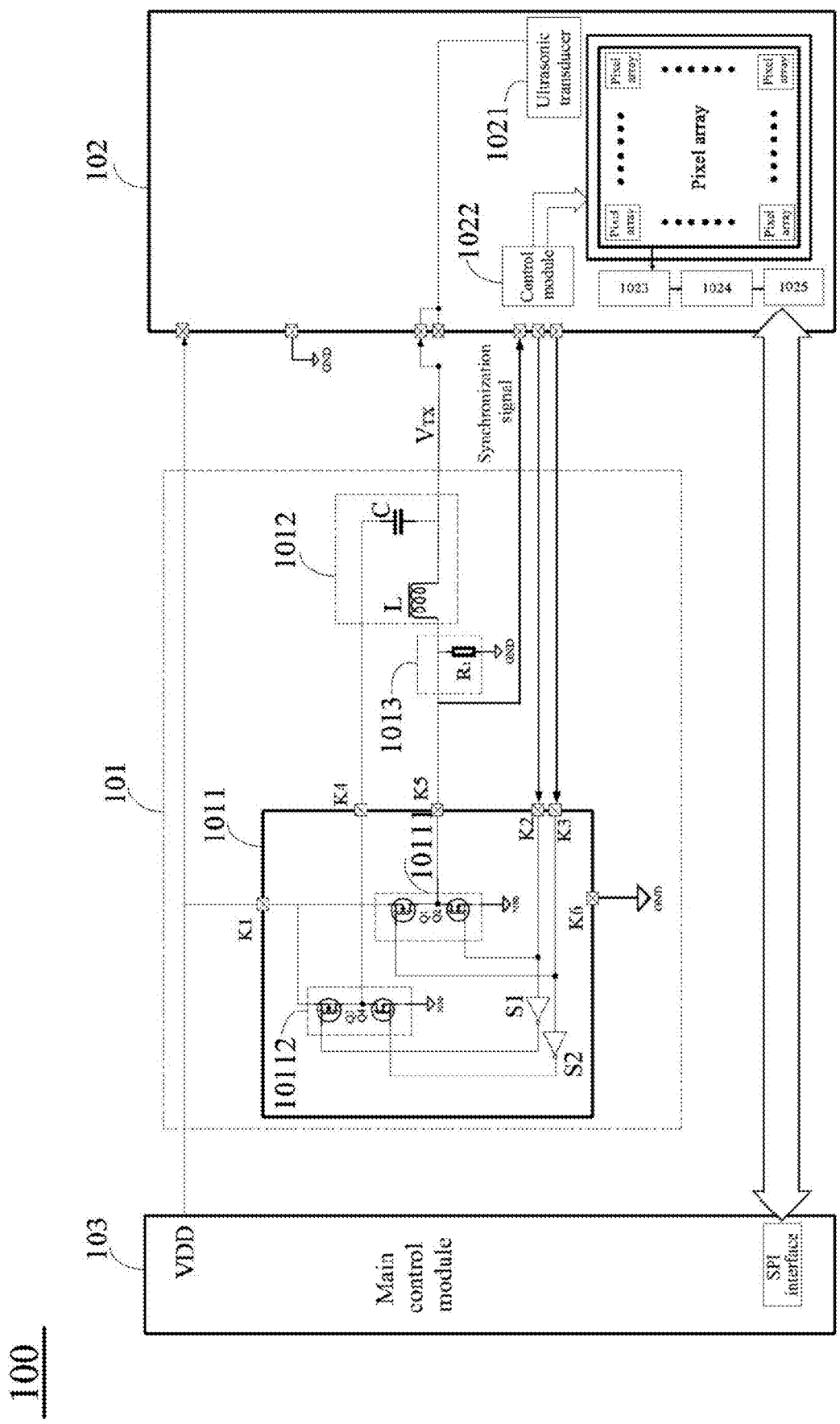
FIG. 3 is a schematic circuit diagram of another ultrasonic transceiver system provided by an embodiment of the present application.

Based on the above-mentioned embodiments, FIG. 3 is a schematic circuit diagram of another ultrasonic transceiver system provided by an embodiment of the present application. As shown in FIG. 3, the pulse generating circuit 1011 in the ultrasonic transceiver system 100 provided by the embodiment of the present application includes: a first half-bridge circuit 10111, a second half-bridge circuit 10112 and a first inverter S1 and a second inverter S2.

An input end of the first half-bridge circuit 10111 is connected to a first output end and a second output end of the ultrasonic sensor chip 102, and an output end of the first half-bridge circuit 10111 is the first pulse output end of the pulse generating circuit 102. The first pulse output end of the pulse generating circuit 102 is configured to output the first pulse voltage signal.

The first output end and the second output end of the ultrasonic sensor chip 102 are configured to output the control signal described above. Specifically, the control signal may include a first pulse control signal (DRN) and a second pulse control signal (DRP). For example, the first output end is configured to output the first pulse control signal, and the second output end is configured to output the second pulse control signal.

An input end of the second half-bridge circuit 10112 is connected to an output end of the first inverter S1 and an output end of the second inverter S2, and an output end of the second half-bridge circuit 10112 is the second pulse output end of the pulse generating circuit 102. The second pulse output end of the pulse generating circuit 102 is configured to output the second pulse voltage signal.

An input end of the first inverter S1 is connected to a first output end of the ultrasonic sensor chip 102, and an input end of the second inverter S2 is connected to a second output end of the ultrasonic sensor chip 102. The first inverter S1 and the second inverter S2 serve to invert signals passing through them. As shown in FIG. 3, since the input end of the first inverter S1 is connected to the first output end of the ultrasonic sensor chip 102, when the first pulse control signal output by the first output end of the ultrasonic sensor chip 102 is at a low level, the first pulse control signal becomes to be at a high level after passing through the first inverter S1. When the first pulse control signal output by the first output end of the ultrasonic sensor chip 102 is at a high level, the first pulse control signal becomes to be at a low level after passing through the first inverter S1. The second inverter S2 is similar to the first inverter S1, and the second inverter S2 differs from the first inverter S1 in that the input end of the second inverter S2 is connected to the second output end of the ultrasonic sensor chip 102.

The pulse generating circuit in the ultrasonic transceiver system provided by the embodiment of the present application includes a first half-bridge circuit, a second half-bridge circuit, a first inverter and a second inverter. By arranging the first inverter and the second inverter, a control of phase inversion for the first pulse control signal and the second pulse control signal can be implemented. Arranging the first half-bridge circuit and the second half-bridge circuit enables the pulse generating circuit to generate, under the action of the control signal, the first pulse voltage signal and the second pulse voltage signal which are in opposite phase to each other. Therefore, a voltage value of the drive signal can be increased through the first pulse voltage signal and the second pulse voltage signal which are in opposite phase to each other, without needing a boost, thus overcoming the problem of the circuit complexity caused by the boost and the problem of the low voltage value resulting in a poor driving effect. The circuit structure is simple, and easy to implement and control, and the boost effect thereof is good.

Reference is still made to FIG. 3, the first half-bridge circuit 10111 may include a first PMOS transistor Q1 and a first NMOS transistor Q2.

A gate of the first PMOS transistor Q1 is connected to the second output end of the ultrasonic sensor chip 102, for inputting the second pulse control signal (DRP) to the first PMOS transistor Q1. A source of the first PMOS transistor Q1 is connected to a power input end of the pulse generating circuit 1011, and the power input end is configured to input electric energy provided by the power supply VDD.

A drain of the first PMOS transistor Q1 is connected to a drain of the first NMOS transistor Q2, and serves as the output end of the first half-bridge circuit 10111 for outputting the first pulse voltage signal. A gate of the first NMOS transistor Q2 is connected to the first output end of the ultrasonic sensor chip 102, for inputting the first pulse control signal (DRN) to the first NMOS transistor Q2, and a source of the first NMOS transistor Q2 is grounded.

When the first pulse control signal and the second pulse control signal are output at a high level, the first PMOS transistor Q1 is turned off, the first NMOS transistor Q2 is turned on, and the first pulse voltage signal output by the first half-bridge circuit 10111 is at a high level. When the first pulse control signal and the second pulse control signal are output at a low level, the first PMOS transistor Q1 is turned on, the first NMOS transistor Q2 is turned off, and the first pulse voltage signal output by the first half-bridge circuit 10111 is at a low level. It can be seen that by controlling the level states of the first pulse control signal and the second pulse control signal, the level state of the first pulse voltage signal can be controlled under the action of the first PMOS transistor Q1 and the first NMOS transistor Q2.

Reference is still made to FIG. 3, the second half-bridge circuit 10112 includes a second PMOS transistor Q3 and a second NMOS transistor Q4.

A gate of the second PMOS transistor Q3 is connected to the output end of the first inverter S1, for inputting the inverted first pulse control signal to the second PMOS transistor Q3. A source of the second PMOS transistor Q3 is connected to the power input end of the pulse generating circuit 1011, and the power input end is configured to input electric energy provided by the power supply VDD.

A drain of the second PMOS transistor Q3 is connected to a drain of the second NMOS transistor Q4, and serves as the output end of the second half-bridge circuit 10112 for outputting the second pulse voltage signal. A gate of the second NMOS transistor Q4 is connected to the output end of the second inverter S2, for inputting the inverted second pulse control signal to the second NMOS transistor Q4. A source of the second NMOS transistor Q4 is grounded.

When the first pulse control signal and the second pulse control signal are output at a high level, since the first pulse control signal is inverted by the first inverter S1 and then input to the second PMOS transistor Q3, the second PMOS transistor Q3 is turned on, and since the second pulse control signal is inverted by the second inverter S2 and then input to the second NMOS transistor Q4, the second NMOS transistor Q4 is turned off, and the second pulse voltage signal output by the second half-bridge circuit 10112 is at a low level. When the first pulse control signal and the second pulse control signal are output at a low level, since the first pulse control signal is inverted by the first inverter S1 and then input to the second PMOS transistor Q3, the second PMOS transistor Q3 is turned off, and since the second pulse control signal is inverted by the second inverter S2 and then input to the second NMOS transistor Q4, the second NMOS transistor Q4 is turned on, and the second pulse voltage signal output by the second half-bridge circuit 10112 is at a high level. It can be seen that by controlling the level states of the first pulse control signal and the second pulse control signal, the level state of the second pulse voltage signal can be controlled under the action of the first inverter S1, the second inverter S2, the second PMOS transistor Q3 and the second NMOS transistor Q4.

Based on the above, it can be seen that under the action of the first half-bridge circuit 10111 and the second half-bridge circuit 10112 and the first inverter S1 and the second inverter S2, when the first pulse control signal and the second pulse control signal are output at a low level, the first NMOS transistor Q2 and the second PMOS transistor Q3 are turned off, the first PMOS transistor Q1 and the second NMOS transistor Q4 are turned on, the first pulse voltage signal is output at a low level, and the second pulse voltage signal is output at a high level, and the two are in opposite phase to each other. When the first pulse control signal and the second pulse control signal are output at a high level, the first NMOS transistor Q2 and the second PMOS transistor Q3 are turned on, the first PMOS transistor Q1 and the second NMOS transistor Q4 are turned off, the first pulse voltage signal is output at a high level, and the second pulse voltage signal is output at a low level, and the two are in opposite phase to each other.

Figure 4:
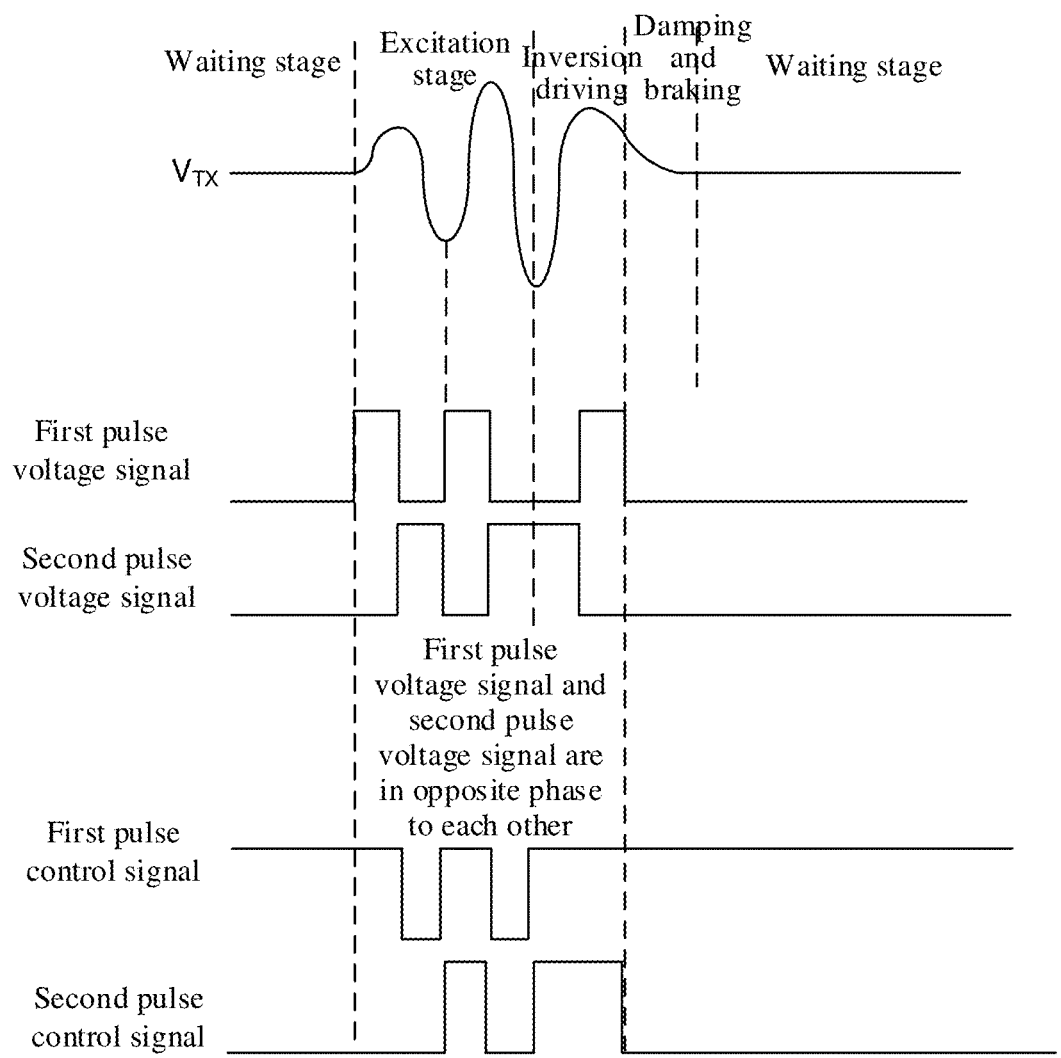
FIG. 4 is a schematic diagram of another waveform provided by an embodiment of the present application.

In some embodiments, by controlling the level states of the first pulse control signal and the second pulse control signal, the first pulse voltage signal and the second pulse voltage signal which are in opposite phase to each other can be output under the action of the pulse generating circuit 1011 shown in FIG. 3. On the basis of FIG. 2, FIG. 4 shows the level states of the first pulse control signal and the second pulse control signal, and the working status of the signal generating circuit 101 corresponding to these control signals under the action of the pulse generating circuit 1011 shown in FIG. 3. The signal-related technical solutions at each stage of the working state shown in FIG. 4 may be similar to that of each stage in the embodiment shown in FIG. 2 above. For specific implementation, reference may be made to the above description, and details will not be repeated here.

In the pulse generating circuit in the ultrasonic transceiver system provided in the embodiment of the present application, under the action of the first half-bridge circuit composed of the first PMOS transistor and the first NMOS transistor, the second half-bridge circuit composed of the second PMOS transistor and the second NMOS transistor, the first inverter and the second inverter, by controlling the level states of the first pulse control signal and the second pulse control signal, the pulse generating circuit is enabled to output the first pulse voltage signal and the second pulse voltage signal which are in opposite phase to each other. Therefore, a voltage value of the drive signal can be increased through the first pulse voltage signal and the second pulse voltage signal which are in opposite phase to each other without needing a boost, thus overcoming the problem of the circuit complexity caused by the boost and the problem of the low voltage value resulting in a poor driving effect. The circuit structure is simple, and easy to implement and control, and the boost effect thereof is good.

In an implementation, the pulse generating circuit 1011 may be provided with multiple input/output ports. As shown in FIG. 4, a port K1 may be a power supply input end, a port K2 is configured to input the first pulse control signal, and a port K3 is configured to input the second pulse control signal. A port K4 is configured to output the first pulse voltage signal, and a port K5 is configured to output the second pulse voltage signal. A port K6 is used for the pulse generating circuit 1011 to be grounded.

Based on the above-mentioned embodiments, the ultrasonic sensor chip 102 shown in FIG. 4 further includes: a control module 1022, a transduction module, a detection module and a pixel array, where the respective implementations, principles and technical effects of the control module 1022, the transduction module, the detection module, and the pixel array here are similar to those of the control module 1022, the transducer module, the detection module and the pixel array shown in FIG. 1, and will not be repeated here.

Figure 5:
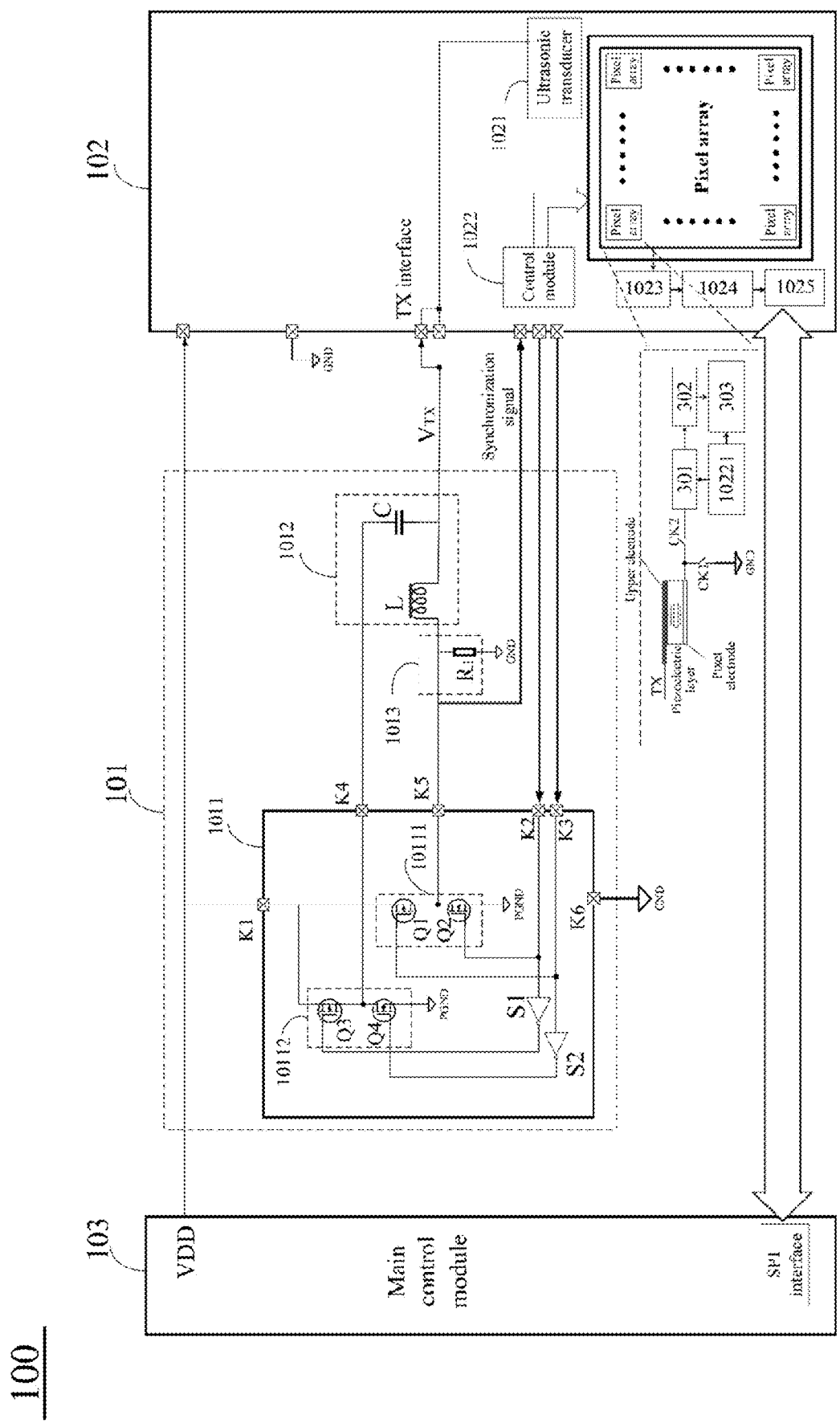
FIG. 5 is a schematic circuit diagram of yet another ultrasonic transceiver system provided by an embodiment of the present application.

Further, on the basis of FIG. 4, the ultrasonic transceiver system 100 shown in FIG. 5 also schematically shows a block diagram of each pixel cell.

When the signal generating circuit 101 outputs the drive signal $V_{TX}$, a first switch CK1 is turned on, and the transducer module is in a transmitting state, and emits ultrasonic waves. When the transmission is over, the first switch CK1 is turned off, and the transducer module waits for a period of time to receive an echo signal. When the echo signal arrives at the transduction module, a second switch CK2 is turned on, and the transduction module converts the echo signal into an electrical signal, and the electrical signal passes through the second switch CK2 to a receiving module 301 and a wave detection module 302 for the reception and detection of the echo signal, and then the echo signal is transmitted to a signal accumulation module 303.

In an implementation, the first switch CK1 and the second switch CK2 can be controlled by a cycle control module 10221, so as to control the operation state of the transducer module. The cycle control module 10221 is included in the control module 1022.

In an implementation, in some implementations, in each pixel cell, the receiving module 301 and the wave detection module 302 may be provided correspondingly. Alternatively, in some other implementations, the same receiving module 301 and wave detection module 302 may be provided for the ultrasonic transducer cells of multiple pixel cells.

An embodiment of the present application further provides an electronic device, including a cover plate and the ultrasonic transceiver system 100 in any of the above embodiments. The cover plate is configured to provide a pressing interface for a user's finger and receive a press by the user's finger. The ultrasonic transceiver system 100 is arranged under the cover plate, to detect a fingerprint pressed on the cover plate by the user's finger.

In some possible implementations, the electronic device further includes a display screen. The cover plate is arranged above the display screen, and correspondingly, the ultrasonic transceiver system 100 is arranged below the display screen, so as to realize the in-screen ultrasonic fingerprint recognition function of the electronic device.

It can be understood that, in the embodiment of the present application, the ultrasonic signal generated by the ultrasonic transceiver system 100 can penetrate the display screen to reach the cover plate, and the ultrasonic signal can propagate at the cover plate and be reflected by the user's finger pressing on the cover plate to form an echo signal, and the echo signal can penetrate the display screen and reach the ultrasonic transceiver system 100 for implementing the fingerprint detection function.

In an implementation, the electronic device includes, but is not limited to, a mobile terminal device, such as a mobile phone, a notebook computer, a tablet computer, and the like.

Other embodiments of the present application will be readily apparent to those skilled in the art from consideration of the specification and practice of the present application disclosed herein. The present application is intended to cover any modifications, uses or adaptive changes of the present application, these modifications, uses or adaptive changes follow the general principles of the present application and include common knowledge or conventional technical means in the technical field not disclosed in the present application. The specification and embodiments are to be considered as illustration only, with a true scope and spirit of the present application indicated by the appended claims.

It should be understood that the present application is not limited to the precise constructions which have been described above and shown in the accompanying drawings, and various modifications and changes may be made without departing from the scope thereof. The scope of the present application is limited only by the appended claims.

What is claimed is:

1. An ultrasonic transceiver system, comprising: a signal generating circuit and an ultrasonic sensor chip;

wherein the signal generating circuit is composed of discrete devices and the signal generating circuit comprises: a pulse generating circuit and a resonant circuit; the pulse generating circuit is configured to receive a control signal output by the ultrasonic sensor chip, and generate, according to the control signal, a first pulse voltage signal and a second pulse voltage signal which are in opposite phase to each other; and the resonant circuit is configured to receive the first pulse voltage signal and the second pulse voltage signal which are in opposite phase to each other, and generate a drive signal according to the first pulse voltage signal and the second pulse voltage signal which are in opposite phase to each other; and the ultrasonic sensor chip is configured to receive the drive signal and generate an ultrasonic signal according to the drive signal;

wherein the resonant circuit comprises a resonant inductor and a resonant capacitor;

one end of the resonant inductance is connected to a first pulse output end of the pulse generating circuit; the other end of the resonant inductance, one end of the resonant capacitor and an input end of the ultrasonic sensor chip are connected; and the first pulse output end is configured to output the first pulse voltage signal; and the other end of the resonant capacitor is connected to a second pulse output end of the pulse generating circuit, and the second pulse output end is configured to output the second pulse voltage signal;

wherein the resonant inductor and the resonant capacitor resonate under action of the first pulse voltage signal and the second pulse voltage signal, to generate a sine wave drive signal;

wherein the pulse generating circuit comprises a first half-bridge circuit, a second half-bridge circuit, a first inverter and a second inverter;

an input end of the first half-bridge circuit is connected to a first output end and a second output end of the ultrasonic sensor chip, and an output end of the first half-bridge circuit is the first pulse output end of the pulse generating circuit;

an input end of the second half-bridge circuit is connected to an output end of the first inverter and an output end of the second inverter, and an output end of the second half-bridge circuit is the second pulse output end of the pulse generating circuit; and an input end of the first inverter is connected to the first output end of the ultrasonic sensor chip, and an input end of the second inverter is connected to the second output end of the ultrasonic sensor chip.

2. The ultrasonic transceiver system according to claim 1, wherein the signal generating circuit further comprises a brake circuit, and the brake circuit comprises a damping resistor;

wherein one end of the damping resistor is connected to the first pulse output end of the pulse generating circuit, and the other end of the damping resistor is grounded.

3. The ultrasonic transceiver system according to claim 1, wherein the first output end and the second output end of the ultrasonic sensor chip are configured to output a first pulse control signal and a second pulse control signal, respectively, and the control signal comprises the first pulse control signal and the second pulse control signal.

4. The ultrasonic transceiver system according to claim 1, wherein the first half-bridge circuit comprises a first P-channel metal oxide semiconductor (PMOS) transistor and a first N-channel metal oxide semiconductor (NMOS) transistor;
a gate of the first PMOS transistor is connected to the second output end of the ultrasonic sensor chip, and a source of the first PMOS transistor is connected to a power input end of the pulse generating circuit; and
a drain of the first PMOS transistor is connected to a drain of the first NMOS transistor and is the output end of the first half-bridge circuit, a gate of the first NMOS transistor is connected to the first output end of the ultrasonic sensor chip, and a source of the first NMOS transistor is grounded.

5. The ultrasonic transceiver system according to claim 4, wherein the second half-bridge circuit comprises a second PMOS transistor and a second NMOS transistor;
a gate of the second PMOS transistor is connected to the output end of the first inverter, and a source of the second PMOS transistor is connected to the power input end of the pulse generating circuit; and
a drain of the second PMOS transistor is connected to a drain of the second NMOS transistor and is the output end of the second half-bridge circuit, a gate of the second NMOS transistor is connected to the output end of the second inverter, and a source of the second NMOS transistor is grounded.

6. The ultrasonic transceiver system according to claim 4, wherein the ultrasonic transceiver system further comprises a main control module; and
the main control module comprises a power supply for supplying power to the signal generating circuit and the ultrasonic sensor chip.

7. The ultrasonic transceiver system according to claim 6, wherein the main control module further comprises a serial peripheral interface (SPI) interface; and
the SPI interface is used for communication between the main control module and the ultrasonic sensor chip.

8. The ultrasonic transceiver system according to claim 1, wherein the first pulse voltage signal is further, as a synchronization signal of the drive signal, input to the ultrasonic sensor chip.

9. The ultrasonic transceiver system according to claim 1, wherein the ultrasonic sensor chip comprises an ultrasonic transducer; and
the sine wave drive signal is used to drive the ultrasonic transducer to generate the ultrasonic signal.

10. An electronic device, comprising:
a cover plate, and
an ultrasonic transceiver system;
wherein the cover plate is configured to receive a press by a user's finger, and the ultrasonic transceiver system is arranged under the cover plate, to detect a fingerprint pressed on the cover plate by the user's finger;
wherein the ultrasonic transceiver system comprises: a signal generating circuit and an ultrasonic sensor chip;
the signal generating circuit is composed of discrete devices and comprises: a pulse generating circuit and a resonant circuit; the pulse generating circuit is configured to receive a control signal output by the ultrasonic sensor chip, and generate, according to the control signal, a first pulse voltage signal and a second pulse voltage signal which are in opposite phase to each other; and the resonant circuit is configured to receive the first pulse voltage signal and the second pulse voltage signal which are in opposite phase to each other, and generate a drive signal according to the first pulse voltage signal and the second pulse voltage signal which are in opposite phase to each other; and
the ultrasonic sensor chip is configured to receive the drive signal and generate an ultrasonic signal according to the drive signal;
wherein the resonant circuit comprises a resonant inductor and a resonant capacitor;
one end of the resonant inductance is connected to a first pulse output end of the pulse generating circuit; the other end of the resonant inductance, one end of the resonant capacitor and an input end of the ultrasonic sensor chip are connected; and the first pulse output end is configured to output the first pulse voltage signal; and
the other end of the resonant capacitor is connected to a second pulse output end of the pulse generating circuit, and the second pulse output end is configured to output the second pulse voltage signal;
wherein the resonant inductor and the resonant capacitor resonate under action of the first pulse voltage signal and the second pulse voltage signal, to generate a sine wave drive signal;
wherein the pulse generating circuit comprises a first half-bridge circuit, a second half-bridge circuit, a first inverter and a second inverter;
an input end of the first half-bridge circuit is connected to a first output end and a second output end of the ultrasonic sensor chip, and an output end of the first half-bridge circuit is the first pulse output end of the pulse generating circuit;
an input end of the second half-bridge circuit is connected to an output end of the first inverter and an output end of the second inverter, and an output end of the second half-bridge circuit is the second pulse output end of the pulse generating circuit; and
an input end of the first inverter is connected to the first output end of the ultrasonic sensor chip, and an input end of the second inverter is connected to the second output end of the ultrasonic sensor chip.

11. The electronic device according to claim 10, wherein the electronic device further comprises a display screen, the cover plate is arranged above the display screen, and the ultrasonic transceiver system is arranged below the display screen.

12. The electronic device according to claim 10, wherein the signal generating circuit further comprises a brake circuit, and the brake circuit comprises a damping resistor;
wherein one end of the damping resistor is connected to the first pulse output end of the pulse generating circuit, and the other end of the damping resistor is grounded.

13. The electronic device according to claim 10, wherein the first output end and the second output end of the ultrasonic sensor chip are configured to output a first pulse control signal and a second pulse control signal, respectively, and the control signal comprises the first pulse control signal and the second pulse control signal.

14. The electronic device according to claim 10, wherein the first half-bridge circuit comprises a first P-channel metal oxide semiconductor (PMOS) transistor and a first N-channel metal oxide semiconductor (NMOS) transistor;
  a gate of the first PMOS transistor is connected to the second output end of the ultrasonic sensor chip, and a source of the first PMOS transistor is connected to a power input end of the pulse generating circuit; and
  a drain of the first PMOS transistor is connected to a drain of the first NMOS transistor and is the output end of the first half-bridge circuit, a gate of the first NMOS transistor is connected to the first output end of the ultrasonic sensor chip, and a source of the first NMOS transistor is grounded.

15. The electronic device according to claim 14, wherein the second half-bridge circuit comprises a second PMOS transistor and a second NMOS transistor;
  a gate of the second PMOS transistor is connected to the output end of the first inverter, and a source of the second PMOS transistor is connected to the power input end of the pulse generating circuit; and
  a drain of the second PMOS transistor is connected to a drain of the second NMOS transistor and is the output end of the second half-bridge circuit, a gate of the second NMOS transistor is connected to the output end of the second inverter, and a source of the second NMOS transistor is grounded.

16. The electronic device according to claim 14, wherein the ultrasonic transceiver system further comprises a main control module;
  the main control module comprises a power supply for supplying power to the signal generating circuit and the ultrasonic sensor chip.

* * * * *